(12) United States Patent
Liu

(10) Patent No.: US 8,254,118 B2
(45) Date of Patent: Aug. 28, 2012

(54) ELECTRONIC DEVICE WITH LATCHING ASSEMBLY

(75) Inventor: Bao-Shuai Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 369 days.

(21) Appl. No.: 12/730,215

(22) Filed: Mar. 23, 2010

(65) Prior Publication Data

US 2010/0328861 A1    Dec. 30, 2010

(30) Foreign Application Priority Data

Jun. 25, 2009   (TW) ............................... 98121338 A

(51) Int. Cl.
*G06F 1/16* (2006.01)
(52) U.S. Cl. ......... 361/679.58; 361/679.01; 361/679.02; 361/679.56; 455/575.1; 455/575.4; 379/428.01; 379/433.04; 379/433.13
(58) Field of Classification Search ............. 361/679.01, 361/679.58
See application file for complete search history.

(56) References Cited

U.S. PATENT DOCUMENTS

| | | | | |
|---|---|---|---|---|
| 4,749,891 A | * | 6/1988 | Sheng | 310/15 |
| 5,406,153 A | * | 4/1995 | Flatau et al. | 310/26 |
| 2007/0215451 A1 | * | 9/2007 | Sasloff et al. | 200/600 |
| 2009/0203398 A1 | * | 8/2009 | Griffin | 455/556.1 |
| 2010/0020488 A1 | * | 1/2010 | Mangaroo et al. | 361/679.55 |
| 2010/0210326 A1 | * | 8/2010 | Ladouceur et al. | 455/575.3 |

* cited by examiner

*Primary Examiner* — Anthony Q Edwards
(74) *Attorney, Agent, or Firm* — Altis Law Group, Inc.

(57) ABSTRACT

An electronic device with a latching assembly includes a housing, a battery cover, a circuit board, and a latching assembly. The battery cover includes a pair of hook portions. The circuit board is mounted in the housing. The latching assembly includes a touch element, a magnetic element, and a pair of latching elements. The touch element and the magnetic element are electrically connected to the circuit board. The latching elements are connected with two opposite ends of the magnetic element, respectively. The latching elements cooperate with the hook portions to secure the battery cover to the housing. When the touch element is touched, a touch signal is generated and transmitted to the circuit board, the circuit board charges the magnetic element in response to the touch signal, and when the magnetic element is charged, the magnetic element contract to cause the latching elements to disengage from the hook portions.

8 Claims, 6 Drawing Sheets

ELECTRONIC DEVICE WITH LATCHING ASSEMBLY

BACKGROUND

1. Technical Field

The present disclosure relates to electronic devices and, particularly, to an electronic device with a latching assembly.

2. Description of Related Art

A latching structure is generally used to engage a battery cover with a housing of a portable electronic device such as a mobile phone. The latching assembly usually includes a pair of hooks formed at one end of the battery cover and a locking pin protruding from the other opposite end of the battery cover. Accordingly, a pair of grooves is defined in one end portion of a backside of the housing of the mobile phone, and a locking hole is defined in the other opposite end portion of the backside of the housing. In assembly, the hooks of the battery cover are firstly inserted into the grooves of the housing, respectively. Then, the battery cover is pressed to the housing until the locking pin of the battery cover is inserted into the locking hole of the housing. Such kind of a latching assembly is simple in structure, and the engagement between the battery cover and the mobile phone is firm. However, during disassembly, great effort is needed to remove the battery cover from the housing, which makes the battery cover susceptible to damage and makes it is inconvenient for a user to replace the battery.

BRIEF DESCRIPTION OF THE DRAWINGS

The components of the drawings are not necessarily drawn to scale, the emphasis instead being placed upon clearly illustrating the principles of an electronic device with a latching assembly. Moreover, in the drawings, like reference numerals designate corresponding parts throughout several views.

DETAILED DESCRIPTION

Figure 1:
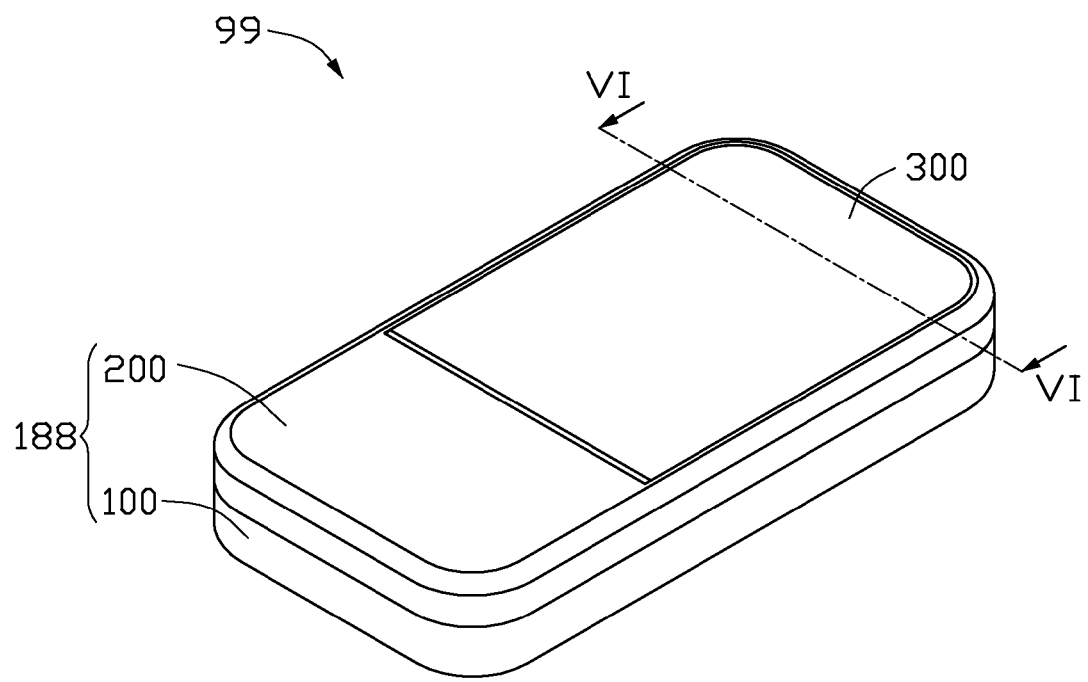
FIG. 1 is an isometric view of an electronic device in accordance with an exemplary embodiment.
Figure 2:
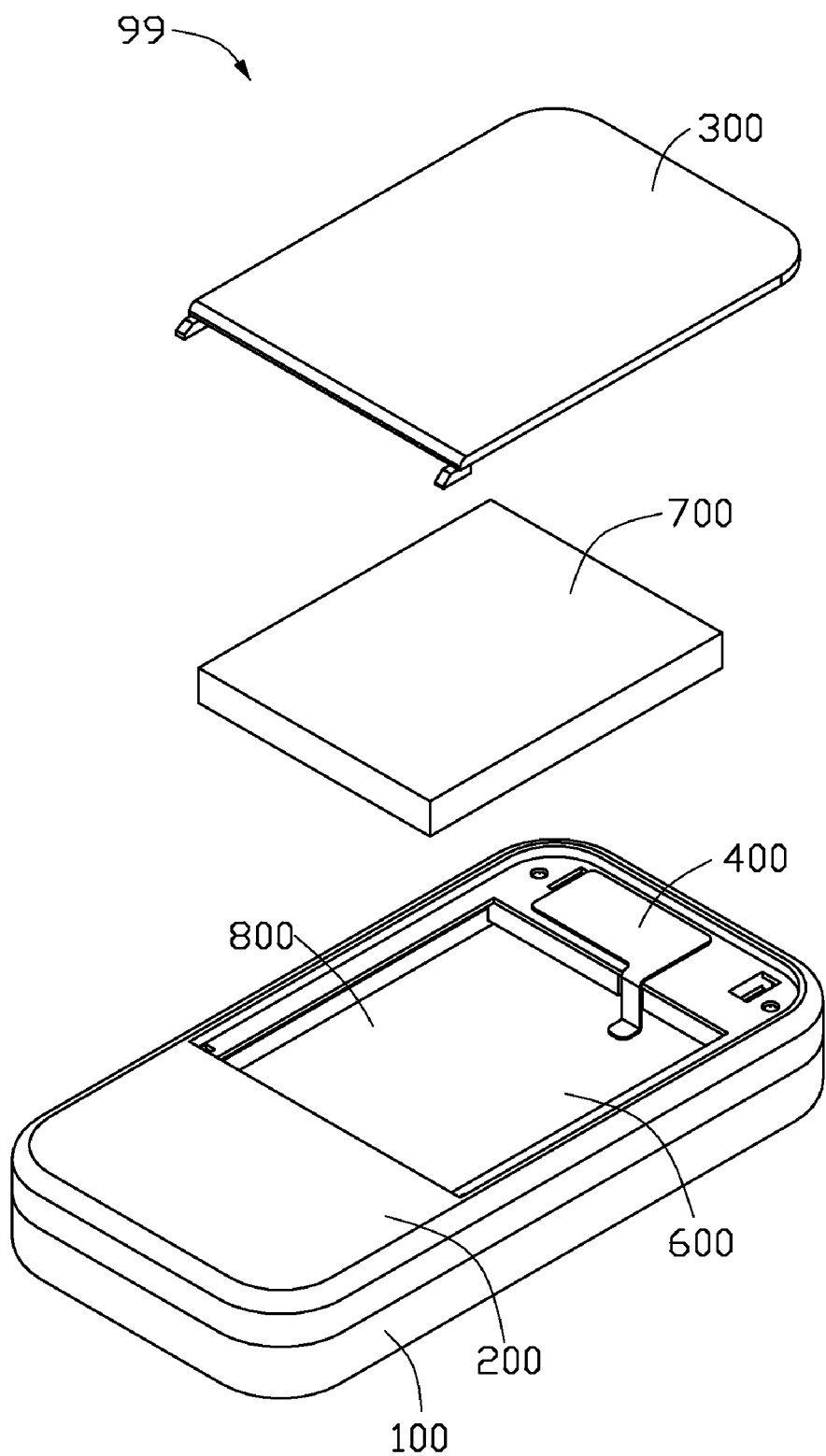
FIG. 2 is a partially exploded, perspective view of the electronic device of FIG. 1.
Figure 3:
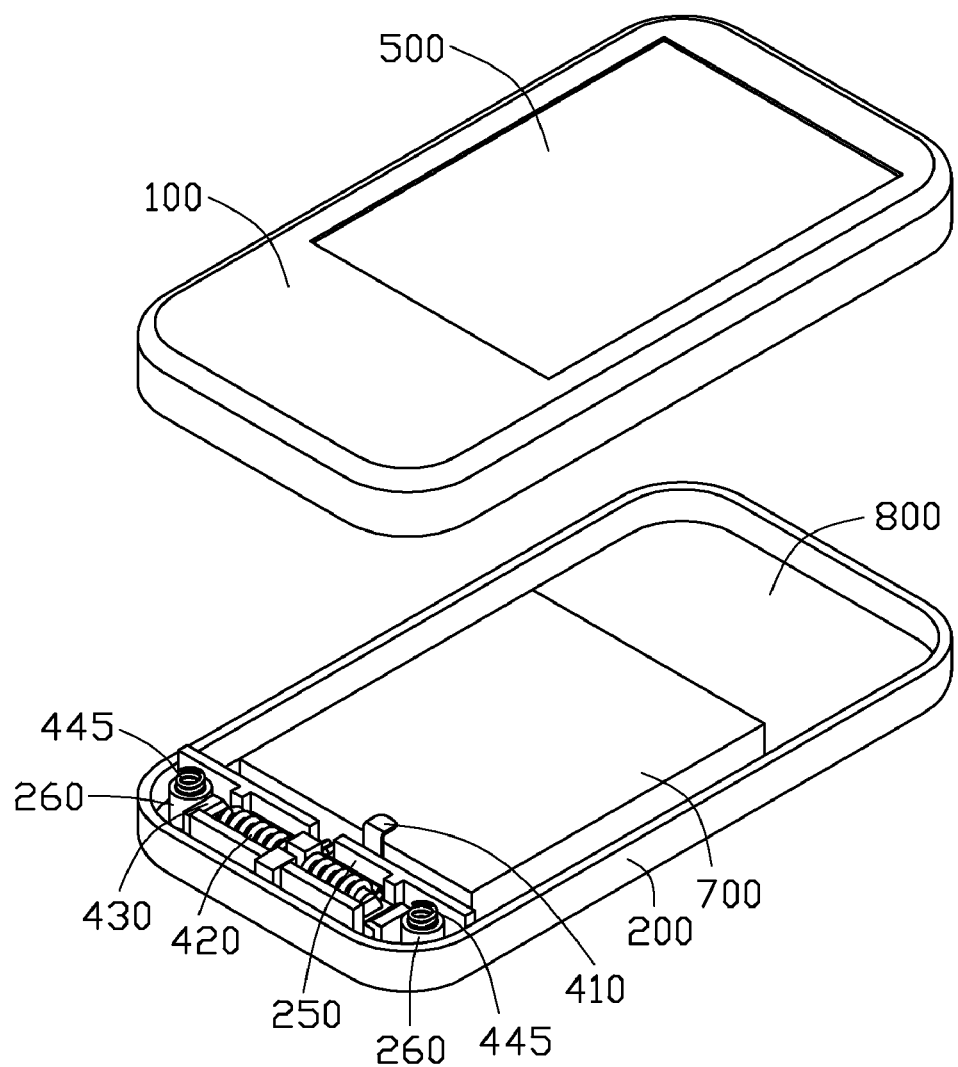
FIG. 3 is another partially exploded, perspective view of the electronic device of FIG. 1, viewed from another orientation.

Referring to FIGS. 1-3, an embodiment of an electronic device 99 is illustrated. The electronic device 99 includes a housing 188, a battery cover 300, a latching assembly 400, a display 500, a circuit board 600, and a battery 700. The latching assembly 400 is configured for fastening/securing the battery cover 300 to the housing 188 and also for removing the battery cover 300 from the housing 188. The housing 188 cooperates with the battery cover 300 to form an interior space for receiving the display 500, the circuit board 600, and the battery 700.

Figure 4:
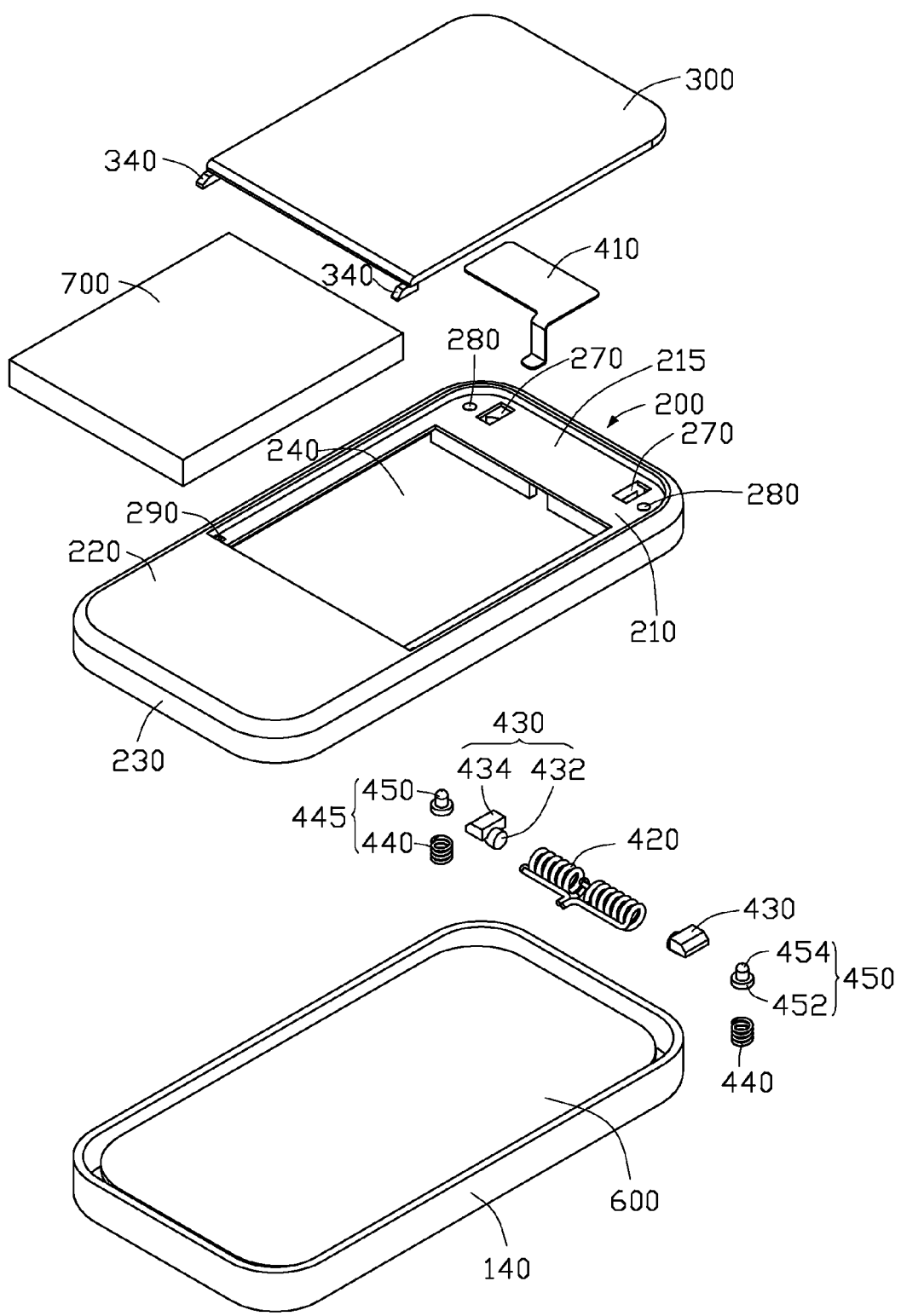
FIG. 4 is an exploded, perspective view of the electronic device of FIG. 2.
Figure 5:
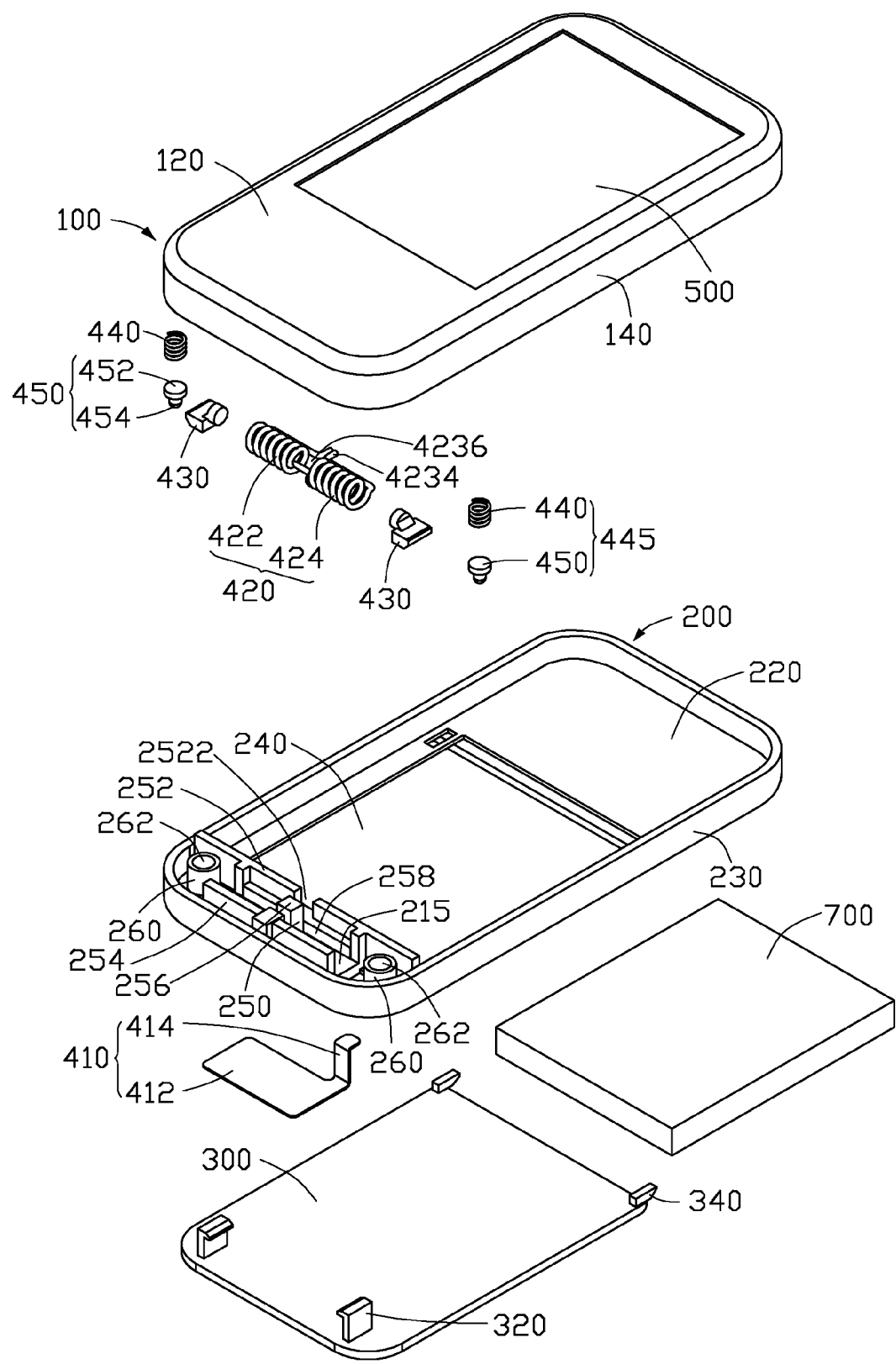
FIG. 5 is an exploded, perspective view of the electronic device of FIG. 3.

Referring also to FIGS. 4-5, the housing 188 includes a first shell 100 and a second shell 200 secured to the first shell 100. The first shell 100 includes a first base board 120 and four first sideboards 140 perpendicularly secured to the first base board 120. The display 500 is mounted on the first base board 120.

The second shell 200 includes a second base board 220 and four second sideboards 230 perpendicularly secured to the second base board 220. The second base board 220 defines a receiving space 210 for receiving the battery cover 300. Also defined in the second base board 220 is a battery cavity 240 below and communicating with the receiving space 210 for receiving the battery 700. The bottom surface 215 of the receiving space 210 defines a pair of latching holes 270 and a pair of first through holes 280. The latching holes 270 and the first through holes 280 are adjacent to one sidewall of the battery cavity 240. The latching holes 270 are disposed between the first through holes 280. A pair of apertures 290 is formed on the bottom surface 215 of the receiving space 210. The apertures 290 are far away from the latching holes 270 and the first through holes 280 and adjacent to opposite sidewalls of the battery cavity 240, respectively.

A receiving portion 250 and a pair of receiving posts 262 are formed on the second base board 220 facing the first shell 100. Each of the receiving posts 262 defines a second through hole 262. Each of the second through holes 262 communicates with one of the first through holes 280. The diameter of each of the second through holes 262 is larger than that of each of the first through holes 280.

The receiving portion 250 is disposed between the receiving posts 262. The receiving portion 250 includes a first baffle 252, a second baffle 254, and a limiting portion 256 disposed between the first baffle 252 and the second baffle 254. The first baffle 252 cooperates with the second baffle 254 to form a receiving cavity 258. An opening 2522 is formed in the first baffle 252. The limiting portion 256 is aligned with the opening 2522.

A pair of hook portions 320 protrudes from one end of the battery cover 300 facing the second shell 200. Each of the hook portions 320 is aligned with one of the latching holes 270. A pair of projections 340 corresponding to the apertures 290 protrudes from the opposite end of the battery cover 300.

The latching assembly 400 includes a touch element 410, a magnetic element 420, a pair of latching elements 430, and a pair of resisting elements 445.

In the embodiment, the touch element 410 is made of metal. The touch element 410 includes a touch portion 412 and a first connecting portion 414. When the touch portion 412 is touched by a user, a touch signal is generated.

The magnetic element 420 includes two coaxial magnetic coils 422 and 424. The magnetic coils 422 and 424 are connected in series to form a loop. A second connecting portion 4234 is formed on the magnetic element 420 to connect the magnetic coils 422 and 424 to each other. A limiting space 4236 is formed between the magnetic coils 422 and 424.

Each of the latching elements 430 includes a fixing portion 432 and a latching portion 434 secured to the fixing portion 432. Each of the latching portions 434 corresponds to one of the hook portions 320.

Each of the resisting elements 445 includes an elastic portion 440 and a resisting portion 450. In the embodiment, the elastic portion 440 is a spring. The resisting portion 450 includes a first cylinder 452 and a second cylinder 454 secured to the first cylinder 452. The spring 440 resists the first cylinder 452. The diameter of the first cylinder 452 is less than that of the second through hole 262 and is larger than that of the first through hole 280. The diameter of the second cylinder 454 is less than that of the first through hole 280.

The following description is for illustrating the process of assembling the electronic device 99. The magnetic element 420 is mounted in the receiving cavity 258 by passing the limiting portion 256 through the limiting space 4236 and placing the second connecting portion 4234 into the opening 2522. Each of the fixing portions 432 is inserted into one of the opposite ends of the magnetic element 420. Each of the second cylinders 454 is placed into one of the first through holes 280, each of the first cylinders 452 is placed into one of the second through holes 262, and each of the springs 440 is placed into one of the second through holes 262 to resist one of the first cylinders 452. The display 500 and the circuit board 600 are mounted on the first shell 140. The first shell 140 is secured to the second shell 200 to cause the second connecting portion 4234 to be electrically connected to the circuit board 600. The touch element 410 is mounted on the bottom surface 215 of the receiving space 210 to cause the first connecting portion 414 to be electrically connected to the circuit board 600. The battery 700 is placed in the battery cavity 240. The battery cover 300 is secured to the second shell 200 by placing the projections 340 into the apertures 290, and by passing the hook portions 320 through the latching holes 270 to hook onto the latching portions 430. After assembly, each of the springs 440 is compressed by the pressure of the battery cover 300.

Figure 6:
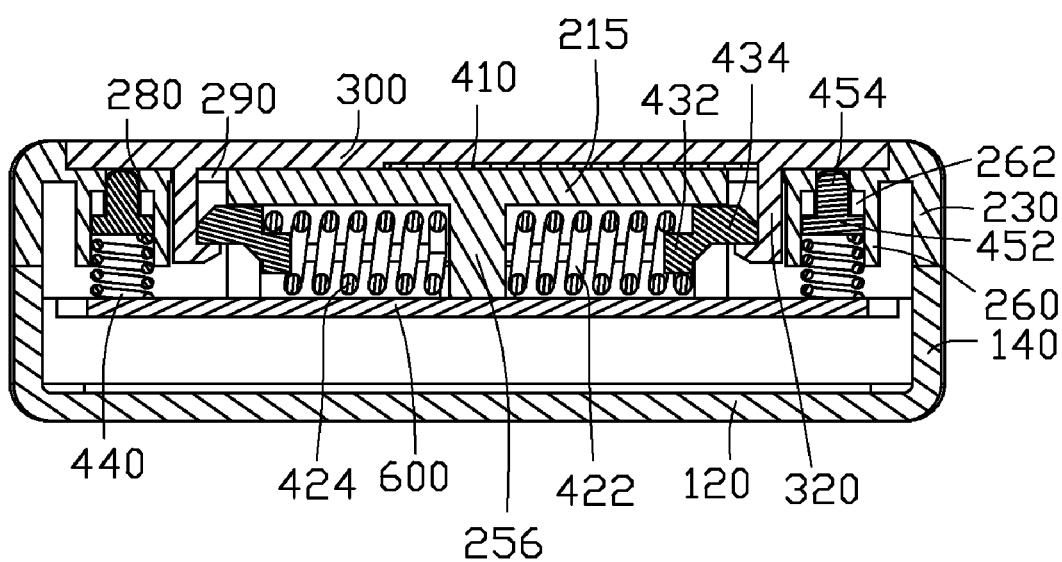
FIG. 6 is a cross-sectional view of the electronic device of FIG. 1, taken along the line VI-VI.

Referring also to FIG. 6, when the touch portion 410 is touched by a force via the battery cover 300, a touch signal is transmitted to the circuit board 600. The circuit board 600 charges the magnetic element 420 via the second connecting portion 4234 in response to the touch signal. When the magnetic element 420 is charged, the magnetic coils 422 and 424 contract, thus the latching portions 434 disengage from the hook portions 320, and each of the springs 440 rebounds to resist one of the resisting portions 450. Each of the resisting portions 450 resists the battery cover 300 until the battery cover 300 can be removed from the housing 188 due to the spring force of each of the springs 440.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device with a latching assembly comprising:
   a housing;
   a battery cover comprising a pair of hook portions;
   a circuit board mounted in the housing; and
   a latching assembly comprising:
      a touch element mounted in the housing and electrically connected to the circuit board;
      a magnetic element mounted in the housing and electrically connected to the circuit board; and
      a pair of latching elements connected with two opposite ends of the magnetic element, respectively, wherein the latching elements cooperate with the hook portions to secure the battery cover to the housing;
   wherein when the touch element is touched, a touch signal is generated and transmitted to the circuit board, the circuit board charges the magnetic element in response to the touch signal, and when the magnetic element is charged, the magnetic element contract to cause the latching elements to disengage from the hook portions.

2. The electronic device as described in claim 1, wherein the latching assembly further comprises at least one resisting element, when the battery cover is secured to the housing, the at least one resisting element is compressed, and when the latching elements disengage from the hook portions, the at least one resisting element rebounds to push the battery cover to separate from the housing.

3. The electronic device as described in claim 2, wherein each of the at least one resisting element comprises an elastic portion and a resisting portion, when the battery cover is secured to the housing, the at least one elastic portion is compressed, and when the latching elements disengage from the hook portions, the at least one elastic portion rebounds to resist the at least one resisting portion, thus the at least one resisting portion pushes the battery cover to separate from the housing.

4. The electronic device as described in claim 3, wherein the number of the at least one resisting element is two, the housing comprises a first shell and a second shell secured to the first shell, the second shell defines a receiving space for receiving the battery cover, a bottom surface of the receiving space defines a pair of first through holes, a pair of receiving posts opposite to the receiving space is formed on the second shell, each of the receiving posts defines a second through hole, each of the second through holes communicates with one of the first through holes, the elastic portions and a part of the resisting portion of one of the resisting elements are received in one of the second through holes, and the other part of each of the resisting portion is received in one of the first through holes.

5. The electronic device as described in claim 4, wherein each of the resisting portions comprises a first cylinder and a second cylinder, each of the elastic portions resists one of the first cylinders, the diameter of each of the first cylinders is less than each of the second through holes and larger than that of each of the first through holes, and the diameter of the each of the second cylinders is less than that of each of the first through holes.

6. The electronic device as described in claim 5, wherein the bottom surface of the receiving space defines a pair of latching holes between the first through holes, each of the hook portions passes through one of the latching holes and hooks onto one of the latching elements.

7. The electronic device as described in claim 5, wherein the magnetic element comprises two coaxial magnetic coils, the magnetic element comprises a connecting portion connecting the magnetic coils, and the connecting portion is electrically connected to the circuit board.

8. The electronic device as described in claim 7, wherein a limiting space is formed on the magnetic element between the magnetic coils, a receiving portion between the receiving posts is formed on the second shell for receiving the magnetic element, the receiving portion comprises a limiting portion and an opening, the limiting portion passes through the limiting space and the connecting portion is placed in the opening.

* * * * *